Patented July 3, 1934

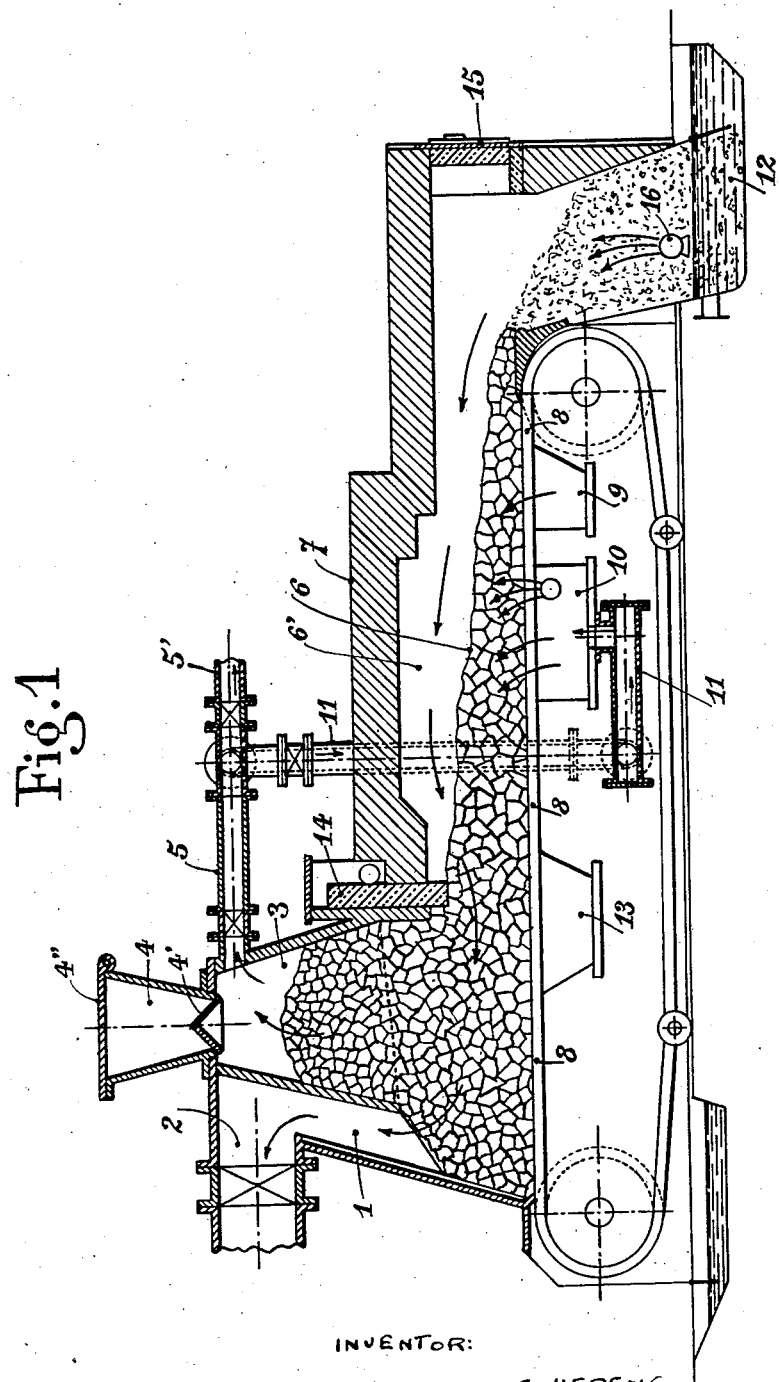

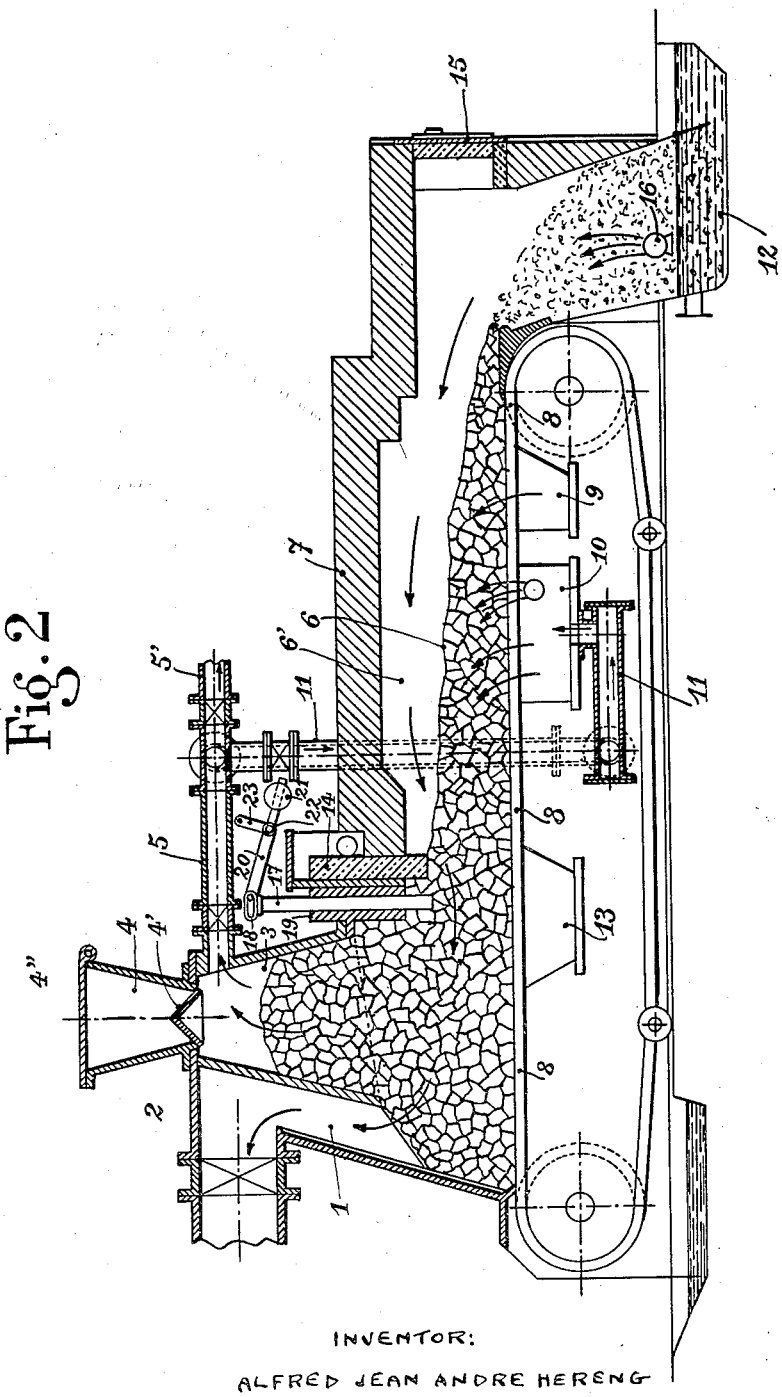

1,964,877

UNITED STATES PATENT OFFICE 1,964,877

APPARATUS FOR THE TREATMENT OF FUEL

Alfred Jean André Hereng, Paris, France

Application July 15, 1930, Serial No. 468,036
In France July 18, 1929

3 Claims. (Cl. 48—76)

The present invention has for its object an apparatus for the treatment of fuel to transform it into useful gaseous products. The apparatus is characterized by the combination of the following elements:—

1. A vertical retort for the reception of the fuel to be treated, the retort being arranged in a vertical chamber, for removal of the gases produced by the gasification of the fuel treated in the apparatus. The retort opens at the bottom into the vertical chamber and is provided in its upper part, with a pipe for the removal of the products liberated in the retort.

2. A horizontal fuel gasification chamber, which receives the fuel leaving the vertical chamber.

3. A horizontal endless conveyer for the fuel, the conveyer being permeable to gases and serving as the bottom of the retort and of the horizontal fuel gasification chamber. The following apparatus is situated below the upper run of the conveyer.

(a) Arrangements for admission of air required for the combustion of the said fuel.

(b) Arrangements for the admission of steam or atomized water.

(c) Arrangements for the admission of the gaseous products liberated in the vertical retort.

(d) An ash-pit for reception of the ashes of the fuel.

The apparatus comprises two distinct parts a vertical part for pre-treatment of the fuel, and a horizontal part for gasification and combustion.

If the fuel to be treated in the apparatus is rich in volatiles, a crusher may be provided between the vertical and the horizontal chambers, so as to cause the agglomerated semi-coke to be broken up into fragments the dimensions of which will be such as not to interfere with the gasification of the fuel. The crusher may be constructed, for example, of vertically movable members having a cutting edge.

An apparatus according to the invention can be used (a) As a simple gas producer, producing solely poor gas by feeding the vertical retort with a fuel such as semi-coke, which has already undergone a low temperature distillation, the retort serving simply as a preheater for the fuel.

(b) As an apparatus for the complete treatment of coal producing simultaneously poor and rich gas, by feeding the vertical retort with a fuel containing volatile matters.

(c) As an apparatus for the complete treatment of fuel, producing solely gas by gasification, by sending part or all of the distillation gases of the fuel through the hot fuel, which is subjected to gasification in the gasification chamber.

The diagrammatic drawings appended given by way of example and without in any way limiting the scope of the present invention show:

Fig. 1, a longitudinal vertical section of an apparatus of the above type.

Fig. 2, the same apparatus, provided with a crusher.

In the two figures the same reference numbers indicate the same elements.

1 is the vertical chamber for the removal of producer gas which escapes by the pipe 2. 3 is the retort for the reception of the fuel. It is inside chamber 1 and opens at its lower end into the chamber. The retort is suspended by three of its sides within the chamber. 4 is the charging funnel for loading fuel into the apparatus, the funnel being provided with a gas tight closure means, cone 4′ and lid 4″. 5 is the pipe for the removal of the gases liberated in the vertical retort; 5′ the exit pipe for the gases of distillation, 6 the horizontal fuel gasification chamber; 6′ the upper part of this chamber; 7 the roof of this chamber; 8 an endless conveyer belt, forming the bottoms of the retort 3 and of the horizontal gasification chamber 6; 9 a chamber for admission of the air necessary for the combustion of the fuel; 10 a chamber for the admission of air charged with steam and drying air, and eventually of atomized water or steam; 11 a pipe for admission of gaseous products liberated in the vertical retort 3; 12 an ash-pit situated at the end of the conveyer 8; 13 a closed chamber; 14 the damper for regulating the height of the layer of fuel admitted into the gasification chamber, the chamber 13 serving as a passage for the gases passing from the horizontal gasification chamber to the vertical chamber 1 for removal of the said gases; 15 is an inspection door for the horizontal gasification chamber; 16 is a supplementary air admission port to bring about the combustion of the products leaving the conveyer grate 8.

In Fig. 2, 17 represents the crusher formed, for example, of vertical angle irons having a lower cutting edge. These angle irons are mounted in a head 18 and can slide in a block 19 under the action of a lever 20. The lever is provided with a counter weight 21 and is rotatable around an axis 22 under the action of an actuating rod 23 which may be operated by any suitable means.

The functioning of the apparatus is as follows:—

The fuel is introduced through the funnel 4 into the retort 3. The retort is heated on three of its lateral faces by the hot gases produced which escape by the pipe 2. The pipe 5 is provided with an exhauster (not shown) which creates a regulable low pressure in the retort 3. The gases of distillation are thus sucked out from the retort 3 with a fraction of the poor gas coming from the chamber 6. The heating of the retort 3 is therefore external and internal.

The damper 14 regulates the thickness of the layer of fuel in the horizontal chamber 6. This thickness may vary with the nature of the fuel and its state of division.

The compartment 9 is subject to draught under pressure which traverses the movable hearth 8 and the layer of incandescent fuel.

The compartment 10 receives:

(a) Blasting air, steam or atomized water.

(b) All or part of the products coming from the pipe 5—11 in case fuel containing volatile matters is introduced into retort 3.

The greater part of the oxygen of the air combines with the incandescent carbon during its passage therethrough, and the gas formed and the uncombined oxygen above the layer of fuel, in the upper part 6' of the chamber 6 will remain at very high temperature in contact with incandescent fuel. The steam dissociates and the oxygen combines, the gases cross once more the layer of fuel to which they give up a part of their sensible heat, and then pass under the damper 14, partly through the chamber 13. The chamber 13 is only a passageway for increasing the cross section of the path under the damper 14 in case the fuel layer is too thin. The gases traverse the chamber 1 and may be directed by the tube 2 to various places of use. A small part traverses the retort 3, causing the coal to distill. From the pipe 5 the distillation products can be sent to the blowing chamber 10. In traversing the incandescent layer, the condensible products are cracked, and the gaseous products enrich the poor gas.

These products may also be condensed to recover tar and motor spirit, and the gaseous products, such as methane, hydrogen and ethers will go to enrich the producer gas.

The incombustible matter is transported above chambers 10 and 9. The pressure of air is regulated separately. Air can be injected at 16 in the ash pit which is gas tight, to oxidize completely carbon in the case of a forced run.

The operation is regulated by the speed of the conveyer hearth and by the pressure of the air.

When rich fuel is treated, the apparatus of Fig. 2 is used and the crusher is periodically actuated, as often as required depending on the speed of the conveyer hearth, to assure the desired breaking up of the semi-coke entering into the gasification chamber. Naturally, a continuously acting crusher can also be used.

Having now particularly described and ascertained the nature of my said invention and in what manner the same is to be performed, I declare that what I claim is:

1. Apparatus for directly generating gas from solid fuel containing volatile matters, comprising a horizontal endless conveyer permeable to gases, a first chamber above a first part of the upper run of the said conveyer, said chamber being provided with a compartment for the inlet and the distillation of the fuel, said compartment being open at its bottom and provided in its upper part with an exit pipe for the distillation gases, a second chamber adjacent to the first chamber and arranged above the last part of the upper run of said conveyer, said second chamber being provided with means for gasifying substantially all the distilled fuel coming from the first chamber, a damper above the layer of distilled fuel between said chambers permitting the gases produced in the second chamber to pass through the layer of distilled fuel into the first chamber and surround and heat said compartment, and an exit opening for the removal of the gases from the first chamber.

2. An apparatus in accordance with claim 1 characterized by a third chamber arranged under and against the upper run of the conveyer and vertically below the damper, said third chamber being open only towards the upper run of the conveyer affording an additional passageway to the gases produced in the second chamber and going into the first chamber.

3. An apparatus in accordance with claim 1, characterized by a pipe connecting the exit pipe for the distillation gases with said second chamber, the gases being circulated through the connecting pipe and the first chamber.

ALFRED JEAN ANDRÉ HERENG.